United States Patent [19]

Hunt

[11] 4,009,145
[45] Feb. 22, 1977

[54] FILLING COMPOUNDS
[75] Inventor: Thomas Hunt, Llancarfan, near Barry, Wales
[73] Assignee: BP Chemicals International Limited, England
[22] Filed: July 28, 1975
[21] Appl. No.: 599,403
[30] Foreign Application Priority Data
Aug. 5, 1974 United Kingdom ............ 34390/74
[52] U.S. Cl. .............................. 260/40 R; 260/863; 260/864
[51] Int. Cl.² ..................... C08K 3/00; C08L 67/06
[58] Field of Search ............ 260/40 R, 864, 45.9 R, 260/863

[56] References Cited
UNITED STATES PATENTS

| | | | |
|---|---|---|---|
| 3,028,360 | 4/1962 | Brooks et al. | 260/864 |
| 3,355,515 | 11/1967 | Rudolph et al. | 260/864 |
| 3,644,612 | 2/1972 | Meyer et al. | 260/864 |

Primary Examiner—J. Ziegler

[57] ABSTRACT

Unsaturated polyester resin based filling compounds contain as accelerator a tertiary amine derived from meta-carboxy aniline.

8 Claims, No Drawings

FILLING COMPOUNDS

The present invention relates to filling and moulding compounds. It particularly relates to filling and moulding compounds based on unsaturated polyester resins that can be stored at ambient temperatures and can be cured at ambient temperatures after the addition of suitable catalysts.

Unsaturated polyester filling compounds are known and comprise, an unsaturated polyester, a monomeric material that copolymerises therewith, a finely divided filler and polymerisation accelerators and promoters. Such compounds are sufficiently stable at ambient temperatures to allow them to be stored before use, i.e. to have an adequate "shelf-life." In use a free radical initiator is added to the unsaturated polyester filling compound just before use to give a product that cures to a solid product on standing. For many purposes, e.g. car body filling applications, a rapid cure at ambient temperatures is required and by selection of the promoter, the accelerator and the free radical initiator satisfactory curing rates can be achieved.

Many known filling compounds when prepared to have a suitable shelf-life and curing characteristics, exhibit discolouration on ageing at ambient temperature particularly at any compound/air interface. Although this does not necessarily mean that the compound is unusable, the discolouration is often the precursor to crusting and premature gelation of the compound. It is also undesirable from an aesthetic point of view.

An object of the present invention is to provide an unsaturated polyester filling compound having improved resistance to discolouration on ageing.

Accordingly the present invention provides an unsaturated polyester filling compound comprising an unsaturated polyester, a monomer that is copolymerisable therewith, a filler, an accelerator and an aromatic tertiary amine promotor having the formula

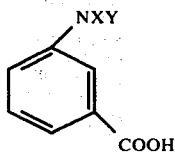

in which X and Y represent lower (up to six carbon atoms) alkyl or alkylol groups that may be the same or different or esters thereof, e.g. lower alkyl esters such as the methyl, ethyl and propyl esters.

The preferred aromatic tertiary amine is 3-dimethyl amino benzoic acid. Other suitable amines are 3-diethylamino benzoic acid and 3-bis ($\beta$-hydroxyethyl) amino benzoic acid.

Unsaturated polyesters for use in filling compounds are well known. Such a polyester is usually a condensation product of a glycol with a mixture of an $\alpha,\beta$-unsaturated dibasic acid or anhydride (for example maleic anhydride or fumaric acid) and a saturated dibasic acid or anhydride such as phthalic acid, possibly modified by the presence of a small amount of polyhydric alcohol (for example pentaerythritol). Examples of suitable copolymerisable monomeric materials are styrene and diallyl pathalate. Such polyesters and suitable monomeric materials are described in British Pat. Nos. 497,175; 592,046; 540,169 and 656,138. Solutions of the unsaturated polyester in a copolymerisable monomer such as styrene are frequently referred to as polyester resins.

The polyester resin can contain polymerisation inhibitors, anti-oxidants, etc., to improve the shelf life of the filling compound. Examples of suitable inhibitors are hydroquinone, quinones, e.g. 2,5-diphenyl benzoquinone.

Fillers for polyester filling compounds are well-known and usually consist of finely divided minerals such as alumina, antimony trioxide, asbestos powder, barium sulphate, calcined clays, china clays, chlorinated waxes, lithopone, magnesium oxide, metal powders (not containing copper), mica powder, precipitated calcium carbonate, silica powder, fumed silica (e.g. Aerosil), slate powder and whiting. A preferred filler is talc.

Accelerators for unsaturated polyester filling compounds are well-known. Examples are cobalt salts such as cobalt octoate and cobalt naphthenate, etc.

The relative proportions of the various components of filling compounds according to the present invention can be varied widely in known manner. Polyester resin solutions preferably contain from 30–50% by weight of copolymerisable monomer. Typically a polyester filling compound contains per 100 parts by weight of unsaturated polyester resin solution:

| | |
|---|---|
| 100 to 200 | parts by weight of filler |
| 0.01 to 0.2 | parts by weight of cobalt metal as cobalt salt accelerator |
| 0.1 to 1.0 | parts by weight of amine promoter |

The consistency of the compound can be made to suit the intended use of the product by adjusting the choice and the relative proportions of the major components, i.e. the polyester, the copolymerisable monomer and the filler.

The polyester filling compounds according to the present invention are mixed with a suitable initiator just prior to use so that cure is effected in a reasonable time under the prevailing conditions. Many initiators are known, e.g. peroxides such as methyl ethyl ketone peroxide, cyclohexanone peroxide and benzoyl peroxide. The final choice again depends on the cure conditions and the chosen accelerator. When cobalt accelerators are employed a preferred initiator is cyclohexanone peroxide. The amount of initiator used can be varied widely depending on the nature of the other materials present in the compound and the curing conditions that are to be employed. Typically when a cobalt accelerator is present cyclohexanone peroxide is added to a concentration of about 1% by weight of the final compound.

The polyester compounds are formulated in known manner and can be mixed by hand or using suitable mixing equipment, e.g. a heavy duty planetary mixer or a Z blade mixer.

The following example gives details of an unsaturated polyester filling compound according to the present invention and compares its ageing properties with those of test compounds containing known promoters and with a control polyester resin containing no promoter.

EXAMPLE

An unsaturated polyester was prepared from maleic anhydride, phthalic anhydride and diethylene glycol (in mole ratio 1 : 1 : 2.15) and dissolved to 70% solids in styrene. The following mixes were then prepared.

| Promoted unfilled polyester resin | |
|---|---|
| Polyester resin solution | 100 parts by weight |
| Cobalt octoate soln. (10% cobalt content) | 1 parts by weight |
| Amine promoter | See Table |
| Filling compound | |
| Promoted unfilled polyester resin solution | 45 parts by weight |
| Talc filler | 55 parts by weight |
| Superwhite pigment paste (Ex. Llewellyn Ryland Ltd, Birmingham). | 0.5 parts by weight |

Samples of unfilled polyester resin solution promoted as shown in the Table and filling compounds derived from these mixes, were stored in 1 oz. glass bottles in the dark at ambient temperatures and 65° C. Results of 28 days' storage are shown in the Table. The samples containing 3-dimethylamino benzoic acid were the only ones showing no staining, discolouration or skinning at ambient temperature and 65° C.

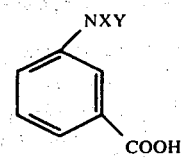

in which X and Y may be the same or different and represent alkyl of 1 to 6 carbon atoms or alkylol of 1 to 6 carbon atoms, or esters thereof.

2. A filling compound as claimed in claim 1 wherein the aromatic tertiary amine is 3-dimethyl amino benzoic acid.

3. A filling compound as claimed in claim 1 wherein the filler is talc.

4. A filling compound as claimed in claim 1 wherein the accelerator is a cobalt salt.

5. A filling compound as claimed in claim 1 which contains per 100 parts by weight of unsaturated polyester resin solution 100–200 parts by weight of filler, 0.1 to 0.2 parts by weight of cobalt metal as cobalt salt accelerator and 0.1 to 1.0 parts by weight of said aromatic tertiary amine promoter.

6. A filling compound as claimed in claim 4, containing cyclohexanone peroxide as a copolymerization initiator.

| Amine additive parts by weight | Initial Appearance | | Appearance after 28 days' storage | | | |
|---|---|---|---|---|---|---|
| | | | Unfilled mix | | Compound | |
| | Unfilled mix | Compound | Ambient | 65° C | Ambient | 65° C |
| Nil Control | Clear Brown | Offwhite paste | Slightly darker than initial | Dark sherry some gel | No discolouration, hard skin | Light buff hard skin |
| 0.4 parts N ethyl,N 2-hydroxy ethyl aniline | " | " | dark sherry | deep crimson | buff | grey on surface, no skin |
| 0.44 parts N,N bis(2-hydroxy ethyl)aniline | " | " | as control | deep red | yellow/buff on surface, hard skin | grey/brown surface stain |
| 0.47 parts N,N bis(2-hydroxy ethyl)m-toluidine | " | " | as control | as control | buff | grey/brown surface stain |
| 0.46 parts N cyanoethyl,N-2 hydroxy ethyl aniline | " | " | as control | as control | yellow/buff on surface, hard skin | orange/brown surface stain |
| 0.37 parts N methyl N-2 hydroxyethyl aniline | " | " | as control | deep red | salmon pink surface | reddish brown surface |
| 0.52 parts N,N bis(2hydroxy ethyl)m.chlor.aniline | " | " | as control | as control | creamy yellow surface, hard skin | orange brown surface |
| 0.38 parts N,N dimethyl m.toluidine | " | " | as control | deep red | grey/brown surface | black surface |
| 0.42 parts N ethyl,N cyanoethyl aniline | " | " | as control | as control | yellow buff surface, hard skin | light red/ brown surface |
| 0.46 parts N ethyl,N cyanoethyl m.toluidine | " | " | as control | as control | buff | dark reddish brown surface |
| 0.39 parts N methyl,N cyanoethyl aniline | " | " | as control | as control | creamy yellow surface, hard skin | orange/brown surface, soft skin |
| 0.425 parts N,N diethyl 2,5 dimethyl aniline | " | " | as control | as control | light brown surface, hard skin | pale buff surface |
| 0.4 parts 3-dimethylamino benzoic acid | " | " | as control | as control | no surface stain, no skin | no surface stain, no skin |
| 0.4 parts 4-dimethylamino benzoic acid | " | " | as control | as control | no surface stain hard skin | orange/brown surface, hard skin |
| 0.5 parts 5-dimethylamino salicylic acid | " | " | deep purple red | dark purple | purple | purple |

I claim:

1. An unsaturated polyester filling compound which comprises an unsaturated polyester, a monomer that is copolymerisable therewith, a filler, an accelerator and an aromatic tertiary amine promoter having the formula 7. A filling compound as claimed in claim 1 and containing a copolymerisation initiator.

8. A filling compound as claimed in claim 1, wherein the aromatic tertiary amine is 3-bis(β-hydroxyethyl)amino benzoic acid or 3-diethylamino benzoic acid.

* * * * *